United States Patent
Dodson et al.

(10) Patent No.: US 9,684,461 B1
(45) Date of Patent: Jun. 20, 2017

(54) DYNAMICALLY ADJUSTING READ DATA RETURN SIZES BASED ON MEMORY INTERFACE BUS UTILIZATION

(71) Applicant: INTERNATIONAL BUSINESS MACHINES CORPORATION, Armonk, NY (US)

(72) Inventors: John S. Dodson, Austin, TX (US); Stephen J. Powell, Austin, TX (US); Eric E. Retter, Austin, TX (US); Jeffrey A. Stuecheli, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/339,406

(22) Filed: Oct. 31, 2016

(51) Int. Cl.
*G06F 12/00* (2006.01)
*G06F 3/06* (2006.01)
*G06F 13/42* (2006.01)

(52) U.S. Cl.
CPC .......... *G06F 3/0613* (2013.01); *G06F 3/0634* (2013.01); *G06F 3/0653* (2013.01); *G06F 3/0658* (2013.01); *G06F 3/0673* (2013.01); *G06F 13/4234* (2013.01)

(58) Field of Classification Search
None
See application file for complete search history.

(56) References Cited

U.S. PATENT DOCUMENTS

| | | |
|---|---|---|
| 5,586,297 A | 12/1996 | Bryg et al. |
| 5,649,153 A | 7/1997 | McNutt et al. |
| 5,968,153 A | 10/1999 | Wheeler et al. |
| 6,353,877 B1 | 3/2002 | Duncan et al. |
| 6,457,081 B1 | 9/2002 | Gulick |
| 6,499,085 B2 | 12/2002 | Bogin et al. |
| 6,529,998 B1 | 3/2003 | Yochai et al. |
| 6,571,322 B2 | 5/2003 | Arimilli |
| 6,785,793 B2 | 8/2004 | Aboulenein et al. |

(Continued)

OTHER PUBLICATIONS

"List of IBM Patents or Patent Applications Treated as Related", dated Oct. 31, 2016, 2 pages.

(Continued)

*Primary Examiner* — Ryan Bertram
*Assistant Examiner* — Jason Blust
(74) *Attorney, Agent, or Firm* — Steven L. Bennett; Amy J. Pattillo

(57) ABSTRACT

A memory system comprises memory devices coupled to a memory controller via a memory interface bus, the memory controller for receiving one or more memory requests via an interconnect. The memory controller tracks utilization of the memory interface bus for reads from the memory devices for a selection of the one or more memory requests during a time window. The memory controller, responsive to detecting utilization of the memory interface bus for reads during the time window reaches a memory utilization threshold, dynamically selects a reduced read data size for a size of data to be accessed from the memory devices by at least one read operation, the reduced data size selected from among at least two read data size options for the at least one read operation of a maximum read data size and the reduced read data size that is less than the maximum read data size.

17 Claims, 5 Drawing Sheets

| READ QUEUE 600 | | | | | |
|---|---|---|---|---|---|
| CORE ID 610 | SELECTED DATA SIZE 612 | VARIABLE SETTING 614 | REDUCED DATA SETTING 616 | | |
| CORE 1 | READ 16X -> 8X | ON | 8X | 622 | ← LEVEL 1 |
| CORE 2 | READ 16X | OFF | | 624 | |
| CORE 4 | READ 16X | ON | 01 | 626 | ← NO |
| CORE 2 | READ 32X -> 16X | ON | THRESHOLD | 628 | ← LEVEL 2 |

(56) References Cited

U.S. PATENT DOCUMENTS

| | | | |
|---|---|---|---|
| 6,799,257 | B2 | 9/2004 | Sprangle et al. |
| 6,959,374 | B2 | 10/2005 | Schulz |
| 7,107,384 | B1 | 9/2006 | Chen et al. |
| 7,139,878 | B2 | 11/2006 | Malik et al. |
| 7,143,246 | B2 | 11/2006 | Johns |
| 7,437,428 | B1 | 10/2008 | Muti et al. |
| 7,526,593 | B2 | 4/2009 | Mandal et al. |
| 7,539,809 | B2 | 5/2009 | Juenger |
| 7,558,887 | B2 | 7/2009 | Gower et al. |
| 7,861,014 | B2 | 12/2010 | Gower et al. |
| 7,958,309 | B2 | 6/2011 | Arimilli et al. |
| 8,117,401 | B2 | 2/2012 | Arimilli et al. |
| 8,250,307 | B2 | 8/2012 | Arimilli et al. |
| 8,266,381 | B2 | 9/2012 | Arimilli et al. |
| 8,473,567 | B2 | 6/2013 | Mannava et al. |
| 8,510,518 | B2 | 8/2013 | O'Connor |
| 8,848,577 | B2 | 9/2014 | Saund et al. |
| 8,984,231 | B2 | 3/2015 | Sun |
| 9,128,868 | B2 | 9/2015 | Lastras-Montano et al. |
| 9,256,541 | B2 | 2/2016 | Sathish et al. |
| 2003/0167385 | A1 | 9/2003 | Lai et al. |
| 2005/0188121 | A1 | 8/2005 | Cho et al. |
| 2006/0020598 | A1* | 1/2006 | Shoolman ............ H04L 67/1027 707/999.008 |
| 2007/0255904 | A1 | 11/2007 | Frank et al. |
| 2009/0019239 | A1 | 1/2009 | Allison et al. |
| 2009/0157919 | A1 | 6/2009 | Dodson et al. |
| 2011/0125947 | A1 | 5/2011 | Dodson et al. |
| 2011/0314231 | A1 | 12/2011 | O'Connor |
| 2013/0103783 | A1 | 4/2013 | Mannava et al. |
| 2014/0143612 | A1 | 5/2014 | Gollub et al. |
| 2014/0325159 | A1* | 10/2014 | Meredith ............ G06F 12/0862 711/135 |
| 2014/0351525 | A1 | 11/2014 | Chen et al. |

OTHER PUBLICATIONS

U.S. Appl. No. 15/339,465, filed Oct. 31, 2016, in re Dodson, 50 pages.

Lu, Tianye et al, "Achieving Efficient Packet-based Memory System by Exploiting Correlation of Memory Requests", 2014, EDAA, 6 pages.

Cuppu, Vinodh et al., "Concurrency, Latency, or System Overhead: Which Has the Largest Impact on Uniprocessor DRAM-System Performance?", Department of Electrical and Computer Engineering, University of Maryland, College Park, 2001 IEEE, 10 pages.

Yoon, Doe Hyun et al, "Adaptive Granularity Memory Systems: A Tradeoff between Storage Efficiency and Throughput", ACM 2011, 12 pages.

Hur, Ibrahim, "Feedback Mechanisms for Improving Probabilistic Memory Prefetching", IEEE 2009, accessed online at <https://www.cs.utexas.edu/~lin/papers/hpca09.pdf>, 12 pages.

Kim, Yoongu et al, "Thread Cluster Memory Scheduling: Exploiting Differences in Memory Access Behavior", Carnegie Mellon University, IEEE, 2010, 12 pages.

Agarwal, Deepak et al, "Exploiting Application—Level Information to Reduce Memory Bandwidth Consumption", University of Maryland at College Park, May 22, 2003, 13 pages.

Park et al., "Future Cache Design using STT MRAMs for Improved Energy Efficiency: Devices, Circuits and Architecture", 49th ACM/EDAC/IEEE Design Automation Conference (DAC), Jun. 2012, pp. 492-497, IEEE Xplore Digital Library (online), ISBN: 978-1-4503-1199-1, DOI: 10.1145/2228360.2228447.

Non-final Office Action, mailing date Feb. 22, 2017, U.S. Appl. No. 15/339,465, filed Oct. 31, 2016, in re Dodson, available via PAIR/IFW, 36 pages.

* cited by examiner

| THRESHOLD SETTINGS 312 | |
|---|---|
| ACTIVITY LEVEL 410 | REDUCED SIZE 412 |
| 75% | LEVEL 1 |  ←414
| 85% | LEVEL 2 |  ←416
| 90% | LEVEL 3 |  ←418

| REDUCED SIZE OPTIONS 318 | | |
|---|---|---|
| REDUCED SIZES 510 | BIT SETTINGS 512 | THRESHOLD SETTINGS 514 |
| 50% | N/A OR 00 | N/A |  ←520
| 25% | 01 | LEVEL 1 |  ←522
| 50% | 10 | LEVEL 2 |  ←524
| 75% | 11 | LEVEL 3 |  ←526

| READ QUEUE 600 | | | | | |
|---|---|---|---|---|---|
| CORE ID 610 | SELECTED DATA SIZE 612 | VARIABLE SETTING 614 | REDUCED DATA SETTING 616 | | |
| CORE 1 | READ 16X -> 8X | ON | 8X | ~622 | ←—LEVEL 1 |
| CORE 2 | READ 16X | OFF | | ~624 | |
| CORE 4 | READ 16X | ON | 01 | ~626 | ←— NO |
| CORE 2 | READ 32X -> 16X | ON | THRESHOLD | ~628 | ←—LEVEL 2 |

DYNAMICALLY ADJUSTING READ DATA RETURN SIZES BASED ON MEMORY INTERFACE BUS UTILIZATION

BACKGROUND

1. Technical Field

The embodiment of the invention relates generally to memory management and particularly to dynamically adjusting read data return sizes based on memory interface bus utilization to optimize read data traffic on a memory interface bus.

2. Description of the Related Art

A memory controller handles memory requests received on a memory channel from one or more cores. The memory controller schedules the use of bandwidth on a memory bus for passing the memory requests to one or more memory devices and receiving responses to the memory requests. Memory requests include read requests, for reading data from the one or more memory devices, and write requests, for writing data to the one or more memory devices.

BRIEF SUMMARY

In one or more embodiments, a memory system comprises one or more memory devices coupled to a memory controller via a memory interface bus. The memory system comprises the memory controller for receiving one or more memory requests via an interconnect. The memory system comprises the memory controller for tracking utilization of the memory interface bus for reads from the one or more memory devices for a selection of the one or more memory requests during a time window. The memory system comprises the memory controller, responsive to detecting utilization of the memory interface bus for reads during the time window reaches a memory utilization threshold, for dynamically selecting a reduced read data size for a size of data to be accessed from the one or more memory devices by at least one read operation from among the one or more memory requests, the reduced data size selected from among at least two read data size options for the at least one read operation of a maximum read data size and the reduced read data size that is less than the maximum read data size.

In one or more embodiments, a method is directed to, a computer system receiving one or more memory requests via an interconnect, the one or more memory requests for accessing one or more memory devices via a memory interface bus. The method is directed to the computer system tracking utilization of the memory interface bus for reads from the one or more memory devices for a selection of the one or more memory requests during a time window. The method is directed to the computer system, responsive to detecting utilization of the memory interface bus for reads during the time window reaches a memory utilization threshold, dynamically selecting a reduced read data size for a size of data to be accessed from the one or more memory devices by at least one read operation from among the one or more memory requests, the reduced data size selected from among at least two read data size options for the at least one read operation of a maximum read data size and the reduced read data size that is less than the maximum read data size.

In addition, in one or more embodiments, a computer program product comprises one or more computer-readable storage devices and program instructions, stored on at least one of the one or more storage devices. The stored program instructions comprise program instructions to receive one or more memory requests via an interconnect, the one or more memory requests for accessing one or more memory devices via a memory interface bus. The stored program instructions comprise program instructions to track utilization of the memory interface bus for reads from the one or more memory devices for a selection of the one or more memory requests during a time window. The stored program instructions comprise program instructions to, responsive to detecting utilization of the memory interface bus for reads during the time window reaches a memory utilization threshold, dynamically select a reduced read data size for a size of data to be accessed from the one or more memory devices by at least one read operation from among the one or more memory requests, the reduced data size selected from among at least two read data size options for the at least one read operation of a maximum read data size and the reduced read data size that is less than the maximum read data size.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of one or more embodiments of the present invention. It will be apparent, however, to one skilled in the art that the one or more embodiments of the present invention may be practiced without these specific details. In other instances, well-known structures and devices are shown in block diagram form in order to avoid unnecessarily obscuring the one or more embodiments of the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
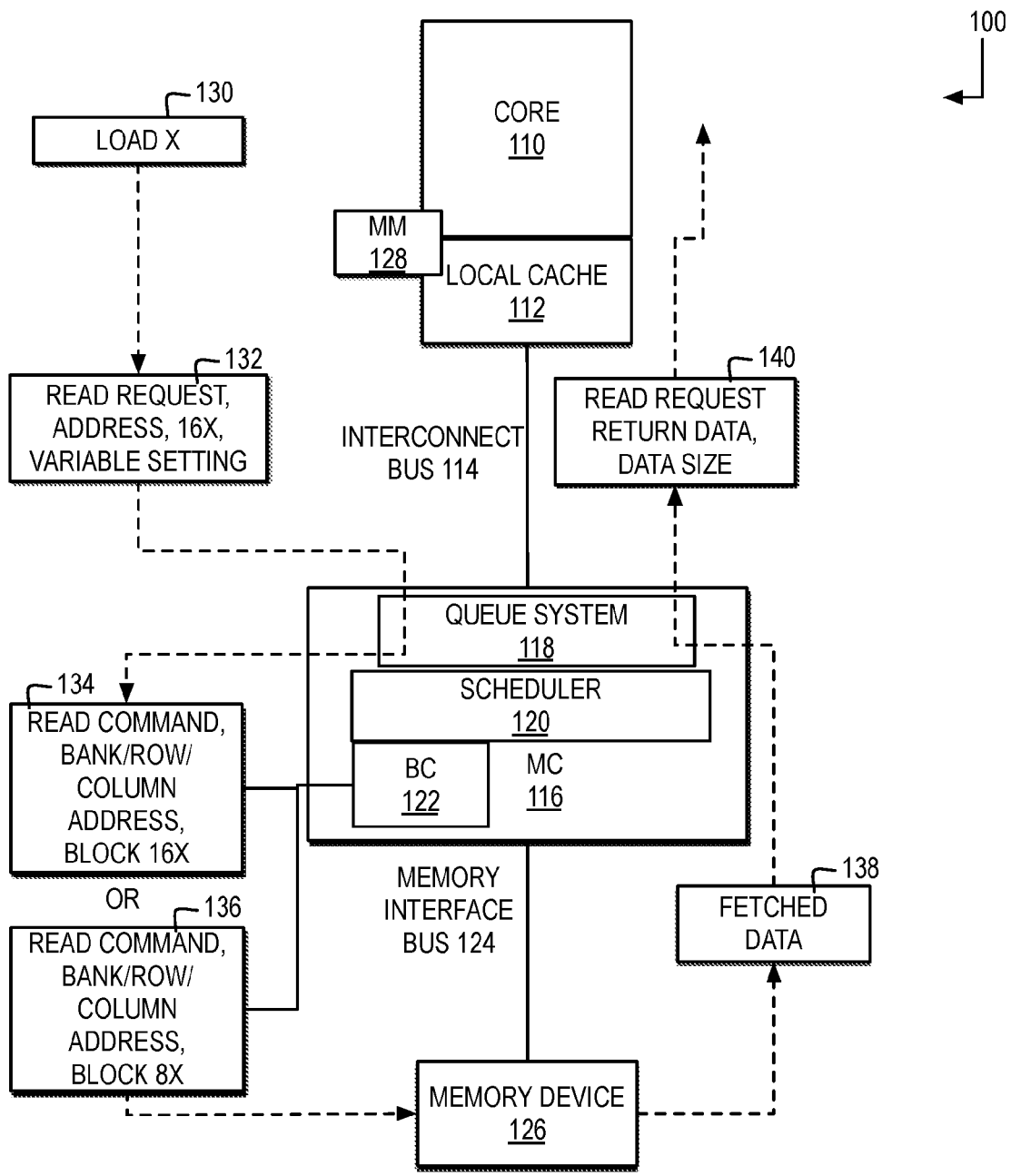
FIG. 1 illustrates one example of block diagram of a memory controller for dynamically adjusting read data return sizes based on memory interface bus utilization to reduce read data traffic on the memory interface bus.

FIG. 1 illustrates a block diagram of one example of a memory controller for dynamically adjusting read data return sizes based on memory interface bus utilization to reduce read data traffic on the memory interface bus.

In one example, a computing system 100 includes one or more memory devices, such as a memory device 126 and memory control elements for managing memory accesses to memory device 126. In one example, the memory control elements may include, but are not limited to, a memory controller 116, a interconnect bus 114 connecting one or more cores to a memory controller 116, and a memory interface bus 124 for connecting memory controller 116 to memory device 126. In one example, memory device 126 represents one or more dynamic random access memory (DRAM) devices.

In one example, one or more processors, such as a core 110, may send memory access requests, such as read and write requests, to memory device 126 via interconnect bus 114, connecting core 110 to MC 116. In one example, interconnect bus 114 may include one or more data buses, of one or more widths, for transferring packets of data between memory controller 116 and core 110, and one or more address busses, of a width that may indicate the amount of system memory a core can read or write into, for transferring addresses and memory request information.

In one example, MC 116 manages receiving memory access requests from interconnect bus 114 and buffering each memory access request in a queue system 118. In one example, queue system 118 may include one or more queues for managing memory access requests identified as read requests and one or more queues for managing memory access requests identified as write requests. In one example, queue system 118 may include multiple queues or other types of buffers, and multiple types of queue or buffer management systems, for efficiently managing buffering of read requests and write requests received from interconnect bus 114 to improve performance.

A scheduler 120 of MC 116 manages scheduling of queued memory access requests from queue system 118 to read from or write to memory device 126 via a memory interface bus 124. In one example, scheduler 120 may implement one or more types of scheduling methods for efficiently managing the scheduling of read requests and write requests on memory interface bus 124 based on the architecture of memory device 126, following timing constraints and refreshes required for proper operation of memory device 126. For example, one or multiple timing constraints required for proper operation of memory device 126 may include a minimum number of cycles to wait before issuing a read command after a write command is issued and a minimum number of cycles to wait before issuing a write command after a read command is issued because it may take time to reverse the direction of the data bus of memory interface bus 124.

For example, memory interface bus 124 may include one of multiple types of connections required to read from and write to memory device 126 and to select to refresh memory device 126. In one example, memory interface bus 124 may include multiple parallel lines available to communicate with memory device 126. In one example, the width of memory interface bus 124, measured in bits, may refer to the number of parallel lines available. In another example, memory interface bus 124 may include a serial data link between MC 116 and memory device 126.

In one example, when scheduler 120 schedules a particular queued read request from queue system 118 to read from memory device 126, scheduler 120 may send a read command and bank, row and column address to read from on memory bus interface 124 as inputs to memory device 126. In one example, memory device 126 may be organized in multiple banks of memory, with data blocks identified by a row and column. In one example, memory device 126 uses the bank, row and column inputs to select the correct memory location, active and buffer an identified row, if not already activated, fetch the requested data, consolidate the data in order to reduce the required bus width for the operation, and return the fetched data on memory bus interface 124 as output from memory device 126.

In addition, queue system 118 may include one or more queues for queuing data read from memory device 126. Scheduler 120 of MC 116 may manage scheduling of data fetched from memory device 126, for output on interconnect bus 114, to return to the core requesting the data. In one example, a single core or multiple cores may send memory access requests to MC 116 on interconnect bus 114 and scheduler 120 may manage efficient scheduling of return data on interconnect bus 114 to the core that sent the memory access request.

In one example, as illustrated in FIG. 1, core 110 may process a load command for loading a particular length of data from a particular location in memory. In one example, core 110 may process a load command illustrated at reference numeral 130 as "LOAD X" for loading data from a particular address in a register. In one example, "X" may represent a number of bytes of memory to be accessed starting from a particular memory address loaded in a register. For example, X may represent 8 bytes.

In one example, core 110 may process the "LOAD X" command illustrated at reference numeral 130 by first searching for the requested data from a local cache 112 coupled to core 110 to determine whether a current copy of the data at an address requested by the "LOAD X" command illustrated at reference numeral 130 is currently loaded into local cache 112. In one example, local cache 112 may represent a high speed, local cache that stores and manages a local copy of data previously accessed from memory device 126, for efficient, high speed access to the data by core 110.

In one example, a memory manager (MM) 128 of core 110 may monitor the status of searches of local cache 112. In one example, if MM 128 detects a cache miss for the requested data for the "LOAD X" command illustrated at reference numeral 130, MM 128 may manage sending a read request for the requested data to an off-core memory, such as memory device 126. In one example, core 110 may include multiple pins that are specified for and connected to interconnect bus 114 that allow MM 128 to send a memory read request on interconnect bus 114 to MC 116 and receive a length of data that is X or multiple times the length of X.

In one example, MM 128 may include functionality that selects, when sending a read request for the "LOAD X" command illustrated at reference numeral 130, whether to select a data size for the read request to memory device 126 that is a multiple larger than X. In one example, as illustrated at reference numeral 132, MM 128 may select to send the "LOAD X" command as a read request "READ REQUEST, ADDRESS, 16X" to memory, where the read request specifies a memory address location and a data size of the read request. In the example, the data size of the read request is set to an amount that is 16 times X (16X). One of ordinary skill in the art will appreciate that MM 128 of core 110 may include memory controller components integrated core 110, local cache 112, and other systems of computer system 100. In additional or alternate embodiments, core 110 may include one or more levels of memory manager components and may include additional or alternate levels of local cache and local memory management. In additional or alternate embodiments MM 128 may select to increase a data size in read request by additional or alternate multiples of X.

In one example, when a cache miss is detected in local cache 112 for a load command and MM 128 sends an off-chip read request for the load command to memory device 126, a result is that bandwidth, power and other processing resources are required for sending the read request on interconnect bus 114, receiving the read request in queue system 118 of MC 116, scheduling the read request by scheduler 120, placing the read request on memory interface bus 124, returning the fetched data for the read request on memory interface bus 124, placing the fetched data in queue 118 to wait for scheduling and placement on interconnect bus 114, and sending the fetched data as read request return data on interconnect bus 114 back to core 110. In one example, to optimize the use of memory control elements and pins allocated for buses, when off-chip read requests are required, MM 128 may increase the read request from an initial length of X to a maximum longer length, such as a length of 16X, as illustrated at reference numeral 132, to read a larger block of memory from memory device 126 than is requested in "LOAD X" and to load the larger block of memory in the read request return data block into local cache 112, in order to increase the probability that a subsequent load request may result in a cache hit in local cache 112 from within the larger block of memory.

In one example, while off-core memory fetching and caching of additional data blocks from memory device 126 with a read request may improve future core efficiency when for a subsequent load instruction there is a cache hit to the additional fetched data in local cache 112, fetching and returning the additional data blocks from memory device 126 places a burden on memory interface bus 124. In particular, the amount of bus bandwidth required on memory interface bus 124 for fetching and returning a 16X block of memory from memory device 126 may be significantly greater than the amount of bandwidth required to fetch an 8X block or X block of memory from memory device 126. In addition, while off-core memory fetching and caching of additional data blocks from memory device 126 with a read request may improve future core efficiency when for a subsequent load instruction there is a cache hit to the additional fetched data in local cache 112, if the data required for subsequent load requests is not sequential within the additional fetched data, the additional fetched data may not be used or even if the additional fetched data is used, only a portion of the additionally fetched data is used, then the bandwidth and power required to fetch the unused additional data did not improve performance and may have slowed down other memory accesses.

In one example, to minimize the impact on memory device 126 of read requests that request more blocks of data than are required for by an initial load request, MM 128 may select, with a read request, to set a variable setting, as illustrated at reference numeral 132. In one example, MC 116 may include a bandwidth controller (BC) 122 that detects read requests with variable settings in queue system 118 and may select to optimize performance on memory interface bus 124 by reducing the read request data size that is fetched and returned over memory interface bus 124 for the read request. In one example, a variable setting with the read request may include, but is not limited to, a particular bit set indicating that the read request return data size may be variable and one or more alternative reduced data sizes. In one example, for example, a variable setting may include a variable bit set and a particular reduced data size, such as 8X. In another example, a variable setting may include a variable bit set and a bit set indicating one or more relative size reductions, such as a bit set for a 25% data size reduction, a bit set for a 50% data size reduction, or a bit set for a 75% data size reduction.

In one example, MM 128 may select to mark a particular read request with a variable setting if MM 128 determines that MM 128 could handle a maximum data size, such as 16X, but that MM 128 may also accept a reduced data size, such as 8X. For example, if MM 128 detects that after a threshold number read requests set with a maximum data size of 16X, MM 128 is only using 8X or none of the additional data returned, MM 128 may determine that for subsequent read requests, MM 128 may handle the maximum data size of 16 X, but that MM 128 may also accept a reduced data size and continue to operate efficiently. In additional or alternate examples, MM 128 may select whether to mark a read request with a variable setting based on additional or alternate types of factors.

In one example, to determine whether to reduce a read request data size of a read request with a variable setting and optimize performance on memory interface bus 124, BC 122 may monitor the utilization of memory interface bus 124 during a time window. In one example, if BC 122 detects that the utilization of memory interface bus 124 for reads from and writes to memory device 126 during the time window exceeds a threshold, BC 122 may select to dynamically reduce the read request data size for read requests waiting in queue system 118 that include a variable setting. For example, if BC 122 detects that the utilization of memory interface bus 124 for reads during the time window does not exceed a threshold, BC 122 may schedule the "read request, address, 16X, with variable setting" request, illustrated at reference numeral 132, as a read command to fetch a data block of a size 16X from memory device starting at a bank, row, and column identified for the address, as illustrated at reference numeral 134. In contrast, if BC 122 detects that the utilization of memory interface bus 124 for reads during the time window does exceed a threshold, BC 122 may select to schedule the "read request 16X, with variable setting" request illustrated at reference numeral 132, as a read command to fetch a data block of a size 8X starting at a bank, row, and column identified for the address, as illustrated at reference numeral 136. In the example, the read command with a data block of a size 8X illustrated at reference numeral 136 may require less bandwidth on memory interface bus 124 than is required of the read command with a data block of a size 16X request illustrated at reference numeral 134. In addition, the read command with a data block of a size 8X may require less power and bandwidth for refreshing and buffering rows of a bank to fetch an 8X data block, than the power and bandwidth required for refreshing and buffering rows of a bank to fetch a 16X data block.

In one example, in response to scheduling the read command for the bank, row and column, with the data size either set to 16X as illustrated at reference numeral 134, or reduced to 8X, as illustrated at reference numeral 136, memory device 126 may access and return fetched data 138 via memory interface bus 124 of the data size requested. In one example, queue system 118 may queue fetched data 138 and schedule bandwidth on interconnect bus 114 to push fetched data 138 on interconnect bus 114 as read request return data, with a data size indicated, as illustrated at reference numeral 140. In one example, queue system 118 may prepare the packet for fetched data 138 to be returned, as illustrated at reference numeral 140, by selecting a particular socket of interconnect bus 114 to push the read request return data on. In one example, interconnect bus 114 may include multiple channels connecting MC 116 with core 110, depending on the number of pins and channels allocated on core 110 for connecting core 110 with MC 116. In one example, interconnect bus 114 may include different channels that handle different widths of data. Depending on the data width that a channel of interconnect bus 114 is able to handle, scheduler 120 may need to break fetched data 138 into multiple packets to be pushed on the channel of interconnect bus 114 to return the fully fetched data block in the read request return data.

In one example, MM 128 may track responses to read requests, and in response to detecting the read request return data illustrated at reference numeral 140, MM 128 may direct the caching of the read request return data illustrated at reference numeral 140 in local cache 112. In one example, if MM 128 does not set a variable setting in a read request packet, MM 128 may track whether the read request return data is returned and whether the returned data has a data size matching the maximum requested data size. In one example, if MM 128 does set a variable setting in a read request packet sent to memory device 126, as illustrated at reference numeral 132, then MM 128 may track whether the read request return data is returned at the maximum requested data size or one or more reduced sizes.

In one example, by reducing the read data size of read requests with variable settings waiting in queue system 118, to reduce the size of data block fetched from memory device 126, memory bus interface 124 may optimize the use of memory interface bus 124 when memory bus utilization for reads exceeds a threshold. In particular, the read requests with variable settings queued in queue system 118 may represent read requests for a block of data that is multiple times larger than the initial size of data requested in a load command at a core. During a time window when use of memory bus interface 124 for reads exceeds a threshold, utilization of memory bus interface 124 may be optimized for a next time window by reducing the read data size of read requests with variable settings because if the read request return data is a reduced size, the use of memory interface bus 124 is reduced and core 110 still receives the data required for the load request, along with a reduced size of additional data for storing in local cache 112, for improving the chance of a hit in local cache 112 for a next load instruction.

Figure 2:
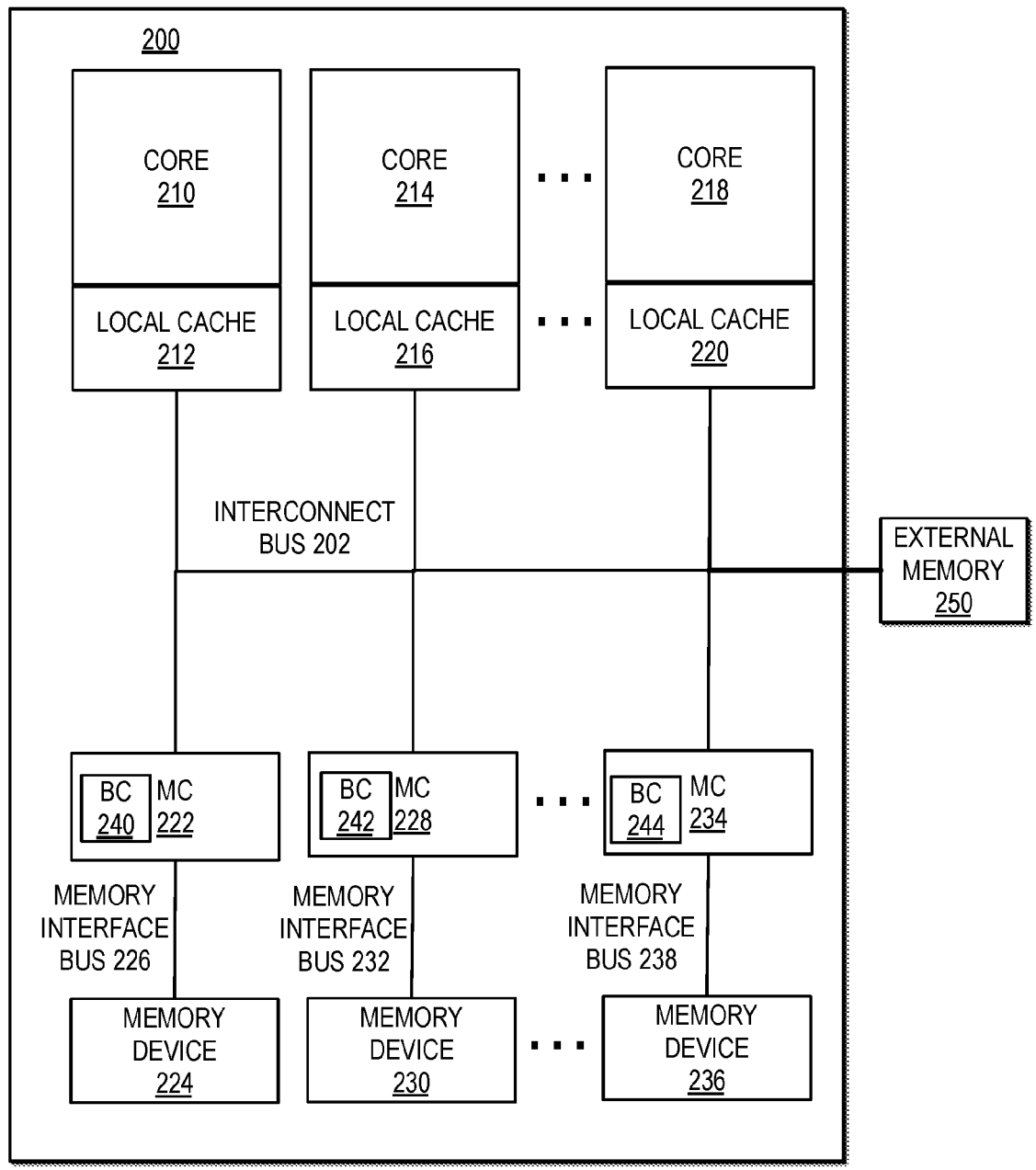
FIG. 2 illustrates one example of a block diagram of multiple off-chip memory devices, each controlled by a separate memory controller for dynamically adjusting read data return sizes for each separate memory device based on memory interface bus utilization to reduce read data traffic on each memory interface bus.

FIG. 2 illustrates a block diagram of one example of multiple off-chip memory devices, each controlled by a separate memory controller for dynamically adjusting read data return sizes for each separate memory device based on memory interface bus utilization to reduce read data traffic on each memory interface bus.

In one example, a computer system 200 may include multiple cores, where a selection of the multiple cores may include a core 210, a core 214, and a core 218. In one example, each of the cores may be integrated with a separate local cache, such as local cache 212 integrated with core 210, local cache 216 integrated with core 214, and local cache 220 integrated with core 218.

In one example, each of core 210, core 214, and core 218 may connect, via a interconnect bus 202, with one or more off-core memory devices, such as a memory device 224, a memory device 230, and a memory device 236, and with one or more external memory devices, such as an external memory 250. In one example, each of memory device 224, memory device 230, and memory device 236 may represent DRAM, as described with respect to memory device 126. In one example, external memory 250 may represent one or more types of data storage including, but not limited to, external hard drives, discs, and USB thumb drives.

In one example, access to memory device 224 is managed by an MC 222 via a memory interface bus 226, access to memory device 230 is managed by an MC 228 via a memory interface bus 232, and access to memory device 236 is managed by an MC 234 via a memory interface bus 238. In one example, each of MC 222, MC 228, and MC 234 may represent a memory controller that performs the functions described for MC 116. In particular, MC 222 may include a BC 240, MC 228 includes a BC 242, and MC 234 includes a BC 244, where each of BC 240, BC 242, and BC 244 may represent a bandwidth controller that performs the functions described for BC 122.

In one example, one or more of core 210, core 214, and core 218 and external memory 250 may each include a memory manager that is enabled, when sending a read request on interconnect bus 202, to mark the read request with a variable setting, if permissible, to indicate that read request return data of variable sizes may be returned for the read request. In one example, each of the cores may mark the read request with a variable setting with a separate reduced data size. For example, core 210 may send a read request for 16X with a variable setting and reduced data size of 8X, but core 212 may send a read request for 32X with a variable setting and multiple reduced data sizes of 16X or 8X. In additional or alternate examples, other examples of read request sizes and variable settings with reduced data sizes may be specified.

In one example, while a single core interacting with a single memory controller may have a limit on the number of memory access requests sent to the memory controller during a clock cycle, when multiple cores are connected to a single memory device or multiple memory devices on interconnect bus 202, each core may send multiple memory access requests to a single memory device during a clock cycle. With the potential for multiple cores to send multiple memory access requests, which may be different data sizes, to any of MC 222, MC 228, and MC 234 during any clock cycle, one MC may have more memory requests to handle during one clock cycle, and other MC may have more memory requests to handle during another clock cycle, such that each MC needs a separate BC to optimize the use of each memory interface bus.

In one example, the BC in each separate MC monitors the utilization of each separate memory interface bus for reads during a programmable window, and if a threshold is reached for a particular memory interface bus, for any read requests with a variable setting that are received at the MC waiting for dispatch on the particular memory interface bus, the BC at the MC reduces the data size of the read request. In one example, a same time window or different time windows may be applied at each BC. For example, BC 240 monitors bus utilization of memory interface bus 226 for reads during a selected time window for BC 240, BC 242 monitors bus utilization of memory interface bus 232 for reads during a selected time window for BC 242, and BC 244 monitors bus utilization of memory interface bus 238 for reads during a selected time window for BC 244.

In one example, BC 240 may detect, during a time window selected for MC 222, that the utilization of memory interface bus 226 for reads exceeds a threshold selected for MC 222. Once BC 240 detects that the utilization of memory interface bus 226 for reads exceeds the threshold, BC 240 may reduce the data size of the read requests waiting during a next time window, for each read request that has a variable setting. For example, MC 222 may have a queue with a read request with a variable setting received from core 210, a read request with a variable setting received from core 214, and a read request without a variable setting received from core 218. BC 240 may reduce the maximum read data size for the read request with a variable setting received from core 210 to a reduced data size, such that MC 222 fetches from memory device 224 and returns, as read request return data to core 210, a data block of the reduced data size for the read request. BC 240 may reduce the maximum read data size for the read request with a variable setting received from core 214 to a reduced data size, such that MC 222 fetches from memory device 224 and returns, as read request return data to core 214, a data block of the reduced data size for the read request. BC 240 may maintain the maximum read data size specified in the read request without a variable setting received from core 218, such that MC 222 fetches from memory device 224 and returns, as read request return data to core 214, a data block of the maximum data size for the read request.

In one example, separately, BC 242 may detect, during a selected time window selected for MC 228, that the utilization of memory interface bus 232 for reads exceeds a threshold selected for MC 228. Once BC 242 detects that the utilization of memory interface bus 232 for reads exceeds the threshold, BC 242 may reduce the data size of the read requests waiting during a next time window, for each read request that has a variable setting. For example, MC 228 may have a queue with a read request with a variable setting received from core 210, a read request with a variable setting received from core 214, and a read request without a variable setting received from core 218. BC 242 may reduce the maximum read data size for the read request with a variable setting received from core 210 to a reduced data size, such that MC 228 fetches from memory device 230 and returns, as read request return data to core 210, a data block of the reduced data size for the read request. BC 242 may reduce the maximum read data size for the read request with a variable setting received from core 214 to a reduced data size, such that MC 228 fetches from memory device 230 and returns, as read request return data to core 214, a data block of the reduced data size for the read request. BC 242 may maintain the maximum read data size specified in the read request without a variable setting received from core 218, such that MC 228 fetches from memory device 230 and returns, as read request return data to core 214, a data block of the maximum data size for the read request.

Figures 3, 4, 5:
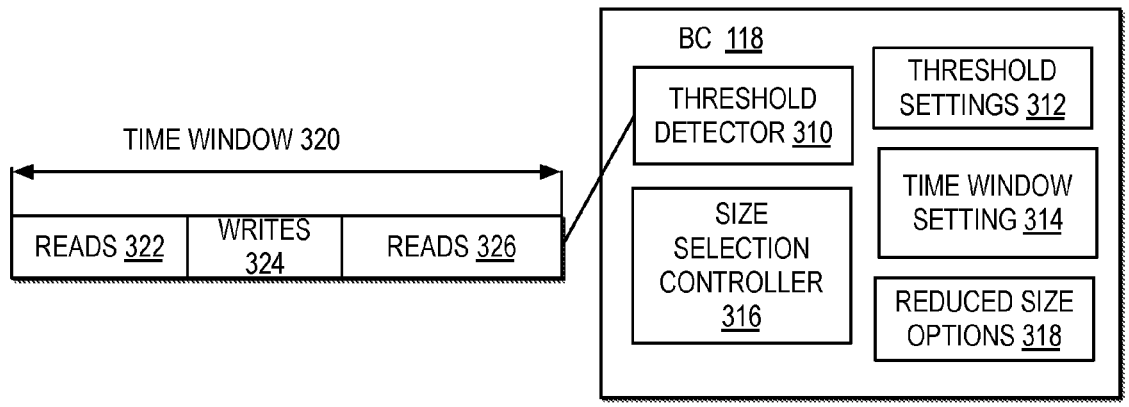
FIG. 3 illustrates one example of a block diagram of a bandwidth controller for dynamically adjusting read data return sizes based on memory interface bus utilization to optimize read data traffic on a memory interface bus.
FIG. 4 illustrates one example of a block diagram of elements of threshold settings in a bandwidth controller for dynamically adjusting read data return sizes if memory interface bus utilization for reads exceeds a threshold setting to optimize read data traffic on a memory interface bus.
FIG. 5 illustrates one example of a block diagram of elements of reduced size option settings in a bandwidth controller for dynamically reducing read data return sizes according to the reduced size options settings if memory interface bus utilization for reads exceeds a threshold setting to optimize read data traffic on a memory interface bus.

FIG. 3 illustrates a block diagram of one example of a bandwidth controller for dynamically adjusting read data return sizes based on memory interface bus utilization to optimize read data traffic on a memory interface bus.

In one example, BC 118 may include a threshold detector 310. Threshold detector 310 monitors utilization of a memory interface bus between a memory controller and a memory device. In one example, threshold detector 310 may sample the memory interface bus utilization during a time window of a length specified in a time window setting 314. For example, threshold detector 310 may sample the percentage of the bandwidth used for reads during a time window 320 of 500 nanosecond (ns). For example, during time window 320, the traffic on memory interface bus 124 may include multiple clock cycles for reads 322, multiple clock cycles for writes 324, and multiple clock cycles of reads 326. In one example, reads 322 and reads 326 may represent clock cycles used for fetching data from memory device 126 for read requests and writes 324 may represent clock cycles used for writing data to memory device 126 for write requests. In one example, threshold detector 310 may count the number of clock cycles of time window 320 that are represented by reads 322 and reads 326 and calculate the percentage of the total time for time window 320 that is used for the clock cycles of time window 320 used for reads 322 and reads 326. In additional or alternate examples, threshold detector 310 may include hardware, software, or a combination of hardware and software for monitoring a number of clock cycles used for reads during a time window and calculating an indicator of the utilization of memory interface bus 124 for reads. In addition, in additional or alternate examples, threshold detector 310 may monitor a number of a clock cycles of time window 320 that are represented by writes 324 and calculate utilization for reads based on the percentage of time window 320 that is not used for writes 324.

In one example, time window setting 314 may be a static setting of a time window loaded into time window settings 314. In another example, time window setting 314 may be a dynamically adjustable setting that may be selected and adjusted by a memory controller based on real-time performance metrics or may be adjusted based on inputs received by the memory controller.

In one example, if threshold detector 310 may run continuously, sampling memory interface bus utilization for reads for each time period of operation, or threshold detector 310 may be triggered to run at particular points in time. In one example, as threshold detector 310 is sampling memory interface bus utilization for reads during a time window, if a memory request arrives that includes a variable setting, threshold detector 310 may compare the sampled memory interface bus utilization for reads during the time window with one or more threshold settings in threshold settings 312. In one example, if the sampled memory interface bus utilization for reads during the time window exceeds at least one threshold setting in threshold settings 312, then threshold detector 310 triggers a size selection controller 316 to reduce the read data size of a next selection of read requests with a variable setting waiting in a read queue of queue system 118.

In one example, threshold settings 312 may identify different threshold levels assigned to different amounts of sampled memory interface bus utilization matched. In one example, threshold settings 312 may include one or more static settings loaded into threshold settings 312. In another example, threshold settings 312 may include one or more dynamically adjustable settings that may be adjusted by a memory controller based on real-time performance metrics or may be adjusted based on an input received by the memory controller.

In one example, size selection controller 316 may select the reduced read data size based on one or more preferences set in reduced size options 318. In one example, each core, in specifying a read request with a variable setting, may specify the reduced size options in the read request in one or more different formats. In one example, to enable BC 118 to read size reductions for a single type or multiple types of read requests with variable settings, from multiple cores, BC 118 may include reduced size options 318 for applying a single format or different formats of reduced size options in read requests with variable settings.

In one example, reduced size options 318 may include a preference that if a read request is received with a variable setting with a single specific reduced data size, size selection controller 316 selects the single specific reduced data size as a reduced read data size. In another example, reduced size options 318 may include a preference that if a read request is received with a variable setting that includes a bit setting for the reduced data size, reduced size options 318 may specify the specific reduced data size corresponding with the bit setting. In another example, reduced size options 318 may include a preference that if a read request is received with a variable setting, but no bit size or setting, reduced size options 318 may specify the specific reduced data size corresponding with a threshold level setting. In another example, reduced size options 318 may include a preference that if a read request is received with a variable setting, but no bit size or setting, reduced size options 318 may specify the specific reduced data size for the specific maximum read data size in the read request. In one example, reduced size options 318 may include one or more static settings loaded into reduced size options 318. In another example, reduced size options 318 may include one or more dynamically adjustable settings that may be adjusted by a memory controller based on real-time performance metrics or may be adjusted based on an input received by the memory controller.

FIG. 4 illustrates one example of a block diagram of elements of threshold settings in a bandwidth controller for dynamically adjusting read data return sizes if memory interface bus utilization for reads exceeds a threshold setting to optimize read data traffic on a memory interface bus.

In one example, threshold settings 312 includes a first column of activity level values, illustrated as activity level 410, and a second column of reduced size indicators, illustrated as reduced size 412. In one example, threshold settings 312 may include one or more settings with a level of activity specified in activity level 410 and a corresponding reduced size indicator specified in reduced size 412.

In the example, as illustrated at reference numeral 414, for an activity level of "75%", the reduced size level indicator is "level 1". In the example, as illustrated at reference numeral 416, for an activity level of "85%", the reduced size level indicator is "level 2". In the example, as illustrated at reference numeral 416, for an activity level of "90%", the reduced size level indicator is "level 3".

In one example, if threshold detector 310 detects that percentage of bandwidth usage of memory bus interface reaches a level of "75%" of the bandwidth available, threshold detector 310 may trigger size selection controller 316 to reduce the data size of one or more read requests with variable settings for a reduced size of "level 1". In one example, if threshold detector 310 detects that percentage of bandwidth usage of memory bus interface reaches a level of "85%" of the bandwidth available, threshold detector 310 may trigger size selection controller 316 to reduce the data size of one or more read requests with variable settings for a reduced size of "level 2". In one example, if threshold detector 310 detects that percentage of bandwidth usage of memory bus interface reaches a level of "90%" of the bandwidth available, threshold detector 310 may trigger size selection controller 316 to reduce the data size of one or more read requests with variable settings for a reduced size of "level 3".

While FIG. 4 illustrates threshold settings 312 with three threshold levels specified, in additional or alternate examples, threshold settings 312 may include a single level or additional levels. In addition, in additional or alternate examples, threshold settings 312 may include activity levels that are specified for a specific type of activity that uses bandwidth.

FIG. 5 illustrates one example of a block diagram of elements of reduced size option settings in a bandwidth controller for dynamically reducing read data return sizes according to the reduced size options settings if memory interface bus utilization for reads exceeds a threshold setting to optimize read data traffic on a memory interface bus.

In one example, a read request with a variable setting may include a reduced data size setting. For example, a read request with a variable setting may include no reduced data size setting. In another example, a read request with a variable setting may include a bit setting of one or more bits. In one example, a read request with a variable setting may include a single bit setting selecting a threshold setting.

In one example, reduced size options 318 may include a first column of reduced sizes 510, a second column of bit settings 512, and a third column of threshold settings 514. In one example, a first setting illustrated at reference numeral 520 includes a reduced size setting of 50% of the maximum data size, if the read request with a variable setting does not include a reduced data size setting, illustrated by "n/a", or if the read request with a variable setting includes a bit setting of "00". In one example, a second setting illustrated at reference numeral 522 includes a reduced size setting of 25% of the maximum data size, if the read request with a variable setting includes a bit setting of "01" or has a bit set for a threshold setting and the threshold setting is "level 1". In one example, a third setting illustrated at reference numeral 524 includes a reduced size setting of 50% of the maximum data size, if the read request with a variable setting includes a bit setting of "10" or has a bit set for a threshold setting and the threshold setting is "level 2". In one example, a fourth setting illustrated at reference numeral 526 includes a reduced size setting of 75% of the maximum data size, if the read request with a variable setting includes a bit setting of "11" or has a bit set for a threshold setting and the threshold setting is "level 3".

While FIG. 5 illustrates reduced size options 318 with four settings specified, in additional or alternate examples, reduced size options 318 may include a single setting or additional settings. In addition, in additional or alternate examples, reduced size options 318 may include additional types of settings in the read request or activity values detected by the bandwidth controller, that are assigned to reduced sizes.

Figures 6, 7:
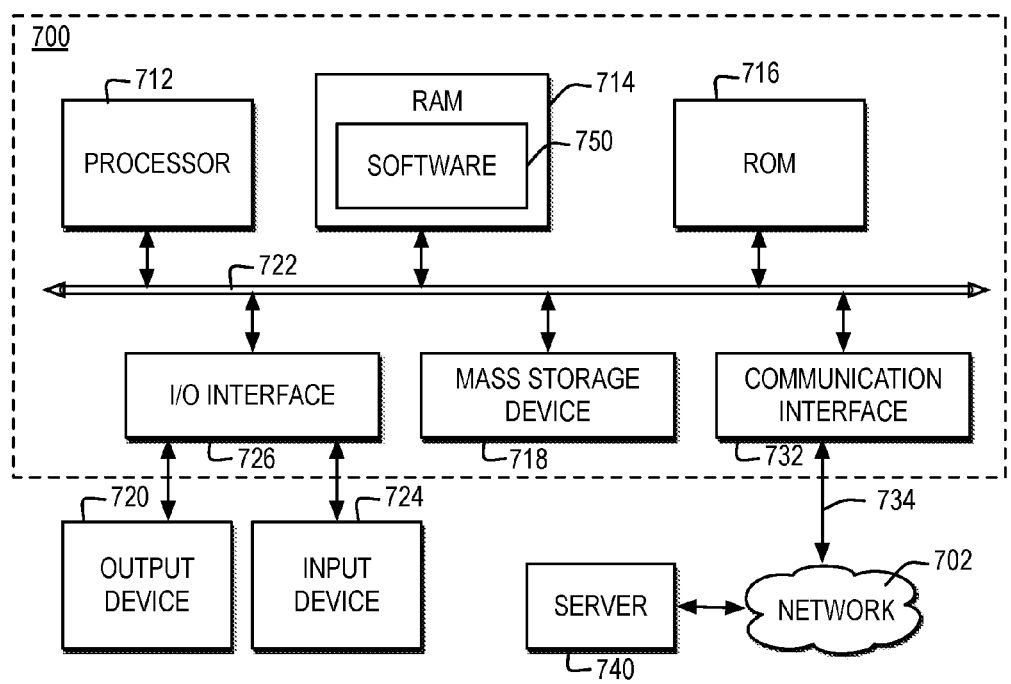
FIG. 6 illustrates one example of a block diagram of multiple read requests waiting in a queue, including multiple read requests with a variable size setting.
FIG. 7 illustrates one example of a block diagram of a computer system in which one embodiment of the invention may be implemented.

FIG. 6 illustrates one example of a block diagram of multiple read requests waiting in a queue, including multiple read requests with a variable size setting.

In one example, a read queue 600, such as a queue within queue system 118, includes multiple queued read requests. In one example, each queued read request may include a core ID 610, a selected data size 612, a variable setting 614, and a reduced data setting 616. In one example, the amount of data fetched for each read request is specified by selected data size 612 at the time of scheduling by scheduler 120. In one example, at the time of scheduling of each read request, if the variable setting for the read request is on, then threshold detector 310 determines whether the memory utilization for reads during a time window exceeds a threshold, and if the threshold is exceeded, size selection controller 316 reduces the selected data size before the read request is scheduled on a memory interface bus.

In one example, a queued read request 622, from "core 1", originally includes a maximum data size of "16X", a variable size setting of "ON", and a reduced data size of "8X", which is a specific data size. In the example, threshold detector 310 detects, when read request 622 arrives, that a level of memory utilization for reads during the time window exceeds a first threshold, identified as "level 1", according to threshold settings 312. In the example, because the memory utilization for reads during the time window exceeds the first threshold, size selection controller 316 is triggered to reduce the selected data size of read request 622. In the example, the reduced data setting received with read request 622 is specified as "8X", therefore size selection controller 316 reduces the selected data size for read request 622 from "16X" to "8X".

In one example, a queued read request 624, from "core 3", originally includes a maximum data size of "16X", a variable size setting of "OFF", and no reduced data size. In the example, threshold detector 310 is not triggered to monitor read request 624 and the selected data size remains the maximum data size of "16X".

In one example, a queued read request 626, from "core 4", originally includes a maximum data size of "16X", a variable size setting of "ON", and a reduced data size of "01", which is a bit setting corresponding with a 25% reduced size in reduced size options 318. In the example, threshold detector 310 detects, when read request 626 arrives, that a level of memory utilization for reads during the time window does not exceed any of the thresholds according to threshold settings 312. In the example, because the memory utilization for reads during the time window does not exceed the first threshold, size selection controller 316 is not triggered to reduce the selected data size of read request 626.

In one example, a queued read request 628, from "core 2", originally includes a maximum data size of "32X", a variable size setting of "ON", and a reduced data size of "threshold". In the example, threshold detector 310 detects, when read request 628 arrives, that a level of memory utilization for reads during the time window exceeds a second threshold, identified as "level 2", according to threshold settings 312. In the example, because the memory utilization for reads during the time window exceeds the second threshold, size selection controller 316 is triggered to reduce the selected data size of read request 628. In the example, the reduced data setting received with read request 628, is based on the threshold. In FIG. 5, setting 524 specifies that for a threshold level of "level 2", the reduced size setting is 50% of the maximum data size. In the example, size selection controller 316 reduces the selected data size for read request 628 from "32X" to 50% of "32X", which is "16X".

While FIG. 6 illustrates read queue 600 with examples of four read requests, in additional or alternate examples, read queue 600 may include additional or alternate types of read requests and may queue additional data with each read request.

FIG. 7 illustrates a block diagram of one example of a computer system in which one embodiment of the invention may be implemented. The one or more embodiments of the present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

Figures 8, 9:
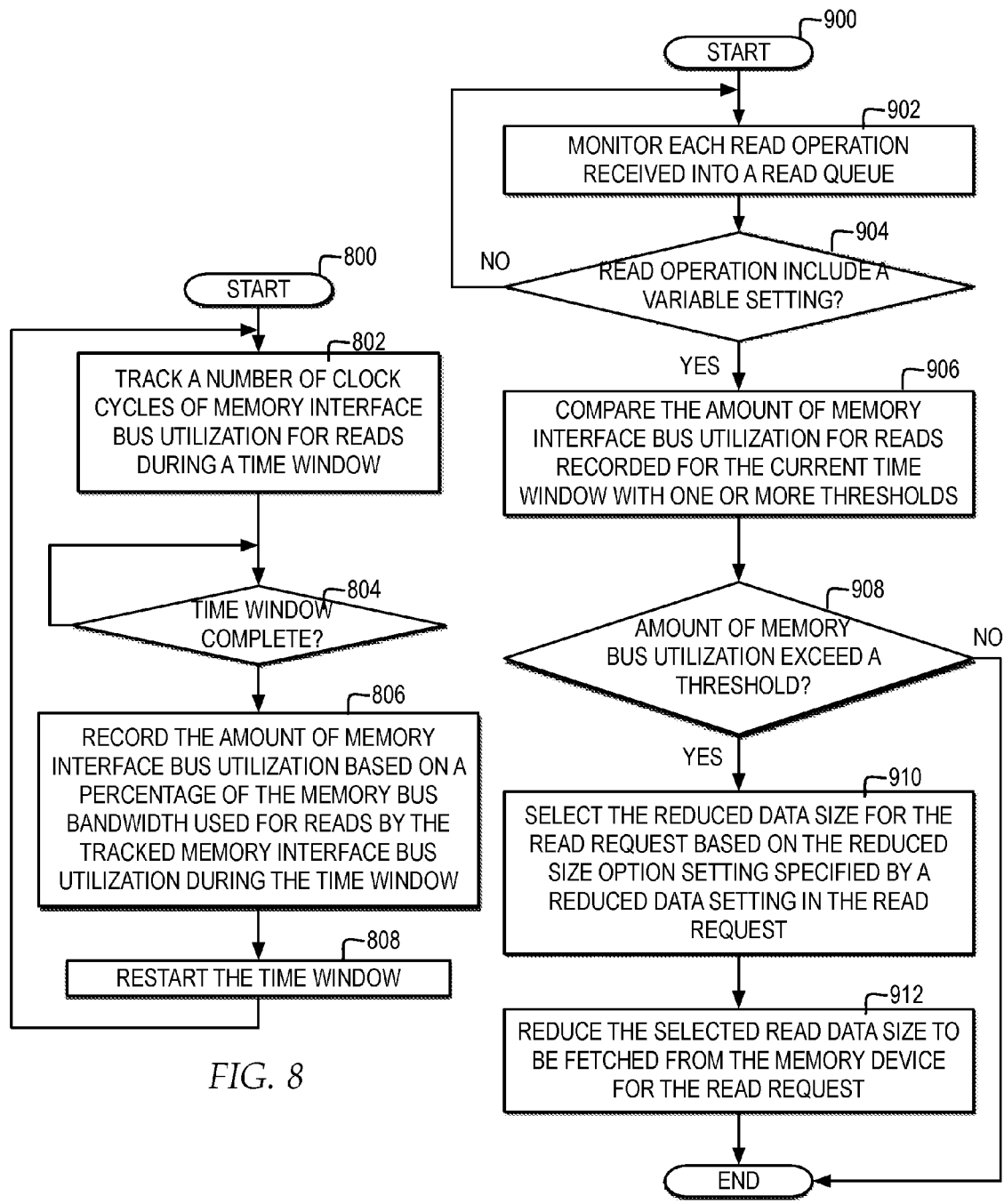
FIG. 8 illustrates one example of a high level logic flowchart of a process and computer program for tracking memory interface bus utilization over time windows.
FIG. 9 illustrates one example of a high level logic flowchart of a process and computer program for dynamically adjusting read data return sizes based on memory interface bus utilization to optimize read data traffic on a memory interface bus.

In one embodiment, the operations performed by processor 712 may control the operations of flowchart of FIGS. 8-9 and other operations described herein. Operations performed by processor 712 may be requested by software 750 or other code or the steps of one or more embodiments of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowcharts in FIGS. 8-9.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In one or more alternate embodiments of the invention, additional or alternate input and output peripheral components may be added.

With respect to FIG. 7, the one or more embodiments of the invention may be a system, a method, and/or a computer program product. The computer program product may include a computer readable storage medium (or media) having computer readable program instructions thereon for causing a processor to carry out aspects of the one or more embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signal per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software project, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more embodiments of the invention.

Aspects of one or more embodiments of the invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to one or more various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to one or more embodiments of the invention.

FIG. 8 illustrates a high level logic flowchart of a process and computer program for tracking memory interface bus utilization for reads over time windows.

In one example, the process and computer program start at block 800 and thereafter proceed to block 802. Block 802 illustrates tracking a number of clock cycles of memory interface bus utilization for reads during a time window. Next, block 804 illustrates a determination whether the time window is complete. If the time window is complete, then the process passes to block 806. Block 806 illustrates recording the amount of memory interface bus utilization based on a percentage of the memory bus utilization bandwidth used for reads by the tracked memory interface bus utilization during the time window. Next, block 808 illustrates restarting the time window, and the process returns to block 802.

FIG. 9 illustrates a high level logic flowchart of a process and computer program for dynamically adjusting read data return sizes based on memory interface bus utilization to optimize read data traffic on a memory interface bus.

In one example, the process and program starts at block 900 and thereafter proceeds to block 902. Block 902 illustrates monitoring each read operation received into a read queue. Next, block 904 illustrates a determination whether a read operation includes a variable setting. At block 904, if a read operation does not include a variable setting, then the process returns to block 902. At block 904, if a read operation includes a variable setting, then the process passes to block 906. Block 906 illustrates comparing the amount of memory interface bus utilization for reads recorded for a current time window with one or more thresholds. Next, block 908 illustrates a determination whether an amount of memory bus utilization for reads exceeds a threshold. At block 908, if the amount of memory bus utilization for reads does not exceed the threshold, then the process ends. At block 908, if the amount of memory bus utilization for reads exceeds the threshold, then the process passes to block 910.

Block 910 illustrates selecting the reduced data size for the read request based on the reduced size option setting specified by a reduced data setting in the read request. Next, block 912 illustrates reducing the selected read data size to be fetched from the memory device for the read request, and the process ends.

The terminology used herein is for the purpose of describing particular embodiments only and is not intended to be limiting of one or more embodiments of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to one or more embodiments of the invention in the form disclosed. Many modifications and variations will be apparent to those of ordinary skill in the art without departing from the scope and spirit of the one or more embodiments of the one or more embodiments of the invention. The embodiment was chosen and described in order to best explain the principles of the one or more embodiments of the invention and the practical application, and to enable others of ordinary skill in the art to understand the one or more embodiments of the invention for various embodiments with various modifications as are suited to the particular use contemplated.

While the one or more embodiments of the invention has been particularly shown and described with reference to one or more embodiments, it will be understood by those skilled in the art that various changes in form and detail may be made therein without departing from the spirit and scope of the one or more embodiments of the invention.

What is claimed is:

1. A memory system comprising:

one or more memory devices coupled to a memory controller via a memory interface bus;

the memory controller operative to receive one or more memory requests via an interconnect, the one or more memory requests comprising one or more read operations with a maximum read data size and a variable setting specifying one or more reduced read data sizes;

the memory controller operative to track utilization of the memory interface bus for reads from the one or more memory devices for a selection of the one or more memory requests during a time window; and the memory controller, responsive to detecting utilization of the memory interface bus for reads during the time window reaches a memory utilization threshold, operative to dynamically select one of the one or more reduced read data sizes for a size of data to be accessed from the one or more memory devices for at least one read operation from among the one or more read operations with the maximum read data size and the variable setting specifying the one or more reduced read data sizes, wherein the selected one of the one or more reduced data sizes for the at least one read operation is less than the maximum read data size and greater than zero.

2. The memory system according to claim 1, further comprising:

the memory controller, responsive to detecting utilization of the memory interface bus for reads during the time window is less than the memory utilization threshold, operative to select the maximum read data size for the size of data returned by the one or more read operations with the maximum read data size and the variable setting specifying one or more reduced read data sizes.

3. The memory system according to claim 1, wherein the memory controller operative to track utilization of the memory interface bus for reads from the one or more memory devices for a selection of the one or more memory requests during a time window further comprises:

the memory controller operative to monitor, for each of the one or more memory requests received via the interconnect, whether the one or more memory requests comprises at least one read operation with a separate variable setting specifying a separate reduced read data size, the one or more memory requests comprising one or more read requests and one or more write requests; and the memory controller, responsive to detecting the at least one read operation with the separate variable setting specifying the separate reduced read data size from among the one or more memory requests, operative to trigger tracking utilization of the memory interface bus for reads from and writes to the one or more memory devices for the selection of the one or more memory requests during the time window.

4. The memory system according to claim 1, further comprising:

the memory controller operative to monitor, for each of the one or more memory requests received via the interconnect, whether the one or more memory requests comprises at least one read operation with a separate variable setting specifying a separate reduced read data size; and the memory controller, responsive to detecting the at least one read operation with the separate variable setting specifying the separate reduced read data size from among the one or more memory requests, operative to trigger comparing utilization of the memory interface bus for reads during the time window with the memory utilization threshold.

5. The memory system according to claim 1, further comprising:

the memory controller operative to detect a particular level identified with the memory utilization threshold, from among a plurality of memory utilization thresholds each identified by a separate level; and the memory controller operative to identify one of the one or more reduced read data sizes specified for the particular level.

6. The memory system according to claim 1, further comprising:

the memory controller operative to receive the one or more memory requests via the interconnect from a plurality of cores; and the one or more memory devices positioned off-core from the plurality of cores and only accessible to the plurality of cores via the interconnect.

7. A method comprising:

a computer system receiving one or more memory requests via an interconnect, the one or more memory requests for accessing one or more memory devices via a memory interface bus, the one or more memory requests comprising one or more read operations with a maximum read data size and a variable setting specifying one or more reduced read data sizes;

the computer system tracking utilization of the memory interface bus for reads from the one or more memory devices for a selection of the one or more memory requests during a time window; and the computer system, responsive to detecting utilization of the memory interface bus for reads during the time window reaches a memory utilization threshold, dynamically selecting one of the one or more reduced read data sizes for a size of data to be accessed from the one or more memory devices for at least one read operation from among the one or more read operations with the maximum read data size and the variable setting specifying the one or more reduced read data sizes, wherein the selected one of the one or more reduced data sizes for the at least one read operation is less than the maximum read data size and greater than zero.

8. The method according to claim 7, further comprising:

the computer system, responsive to detecting utilization of the memory interface bus for reads during the time window is less than the memory utilization threshold, selecting the maximum read data size for the size of data returned by the one or more read operations with the maximum read data size and the variable setting specifying one or more reduced read data sizes.

9. The method according to claim 7, wherein the computer system tracking utilization of the memory interface bus for reads from the one or more memory devices for a selection of the one or more memory requests during a time window further comprises:

the computer system monitoring, for each of the one or more memory requests received via the interconnect, whether the one or more memory requests comprises at least one read operation with a separate variable setting specifying a separate reduced read data size, the one or more memory requests comprising one or more read requests and one or more write requests; and the computer system, responsive to detecting the at least one read operation with the separate variable setting specifying the separate reduced read data size from among the one or more memory requests, triggering tracking of the utilization of the memory interface bus for reads from and writes to the one or more memory devices for the selection of the one or more memory requests during the time window.

10. The method according to claim 7, further comprising:
the computer system monitoring, for each of the one or more memory requests received via the interconnect, whether the one or more memory requests comprises at least one read operation with a separate variable setting specifying a separate reduced read data size; and
the computer system, responsive to detecting the at least one read operation with the separate variable setting specifying the separate reduced read data size from among the one or more memory requests, triggering comparison of the utilization of the memory interface bus for reads during the time window with the memory utilization threshold.

11. The method according to claim 7, further comprising:
the computer system detecting a particular level identified with the memory utilization threshold, from among a plurality of memory utilization thresholds each identified by a separate level; and
the computer system identifying one of the one or more reduced read data sizes specified for the particular level.

12. The method according to claim 7, further comprising:
the computer system receiving the one or more memory requests via the interconnect from a plurality of cores, the one or more memory devices positioned off-core from the plurality of cores and only accessible to the plurality of cores via the interconnect.

13. A computer program product comprising a computer readable storage medium having program instructions embodied therewith, wherein the computer readable storage medium is not a transitory signal per se, the program instructions executable by a memory controller to cause the memory controller to:
receive, by the memory controller, one or more memory requests via an interconnect, the one or more memory requests for accessing one or more memory devices via a memory interface bus, the one or more memory requests comprising one or more read operations with a maximum read data size and a variable setting specifying one or more reduced read data sizes;
track, by the memory controller, utilization of the memory interface bus for reads from the one or more memory devices for a selection of the one or more memory requests during a time window; and
responsive to detecting utilization of the memory interface bus for reads during the time window reaches a memory utilization threshold, dynamically select, by the memory controller, one of the one or more reduced read data sizes for a size of data to be accessed from the one or more memory devices for at least one read operation from among the one or more read operations with the maximum read data size and the variable setting specifying the one or more reduced read data sizes, wherein the selected one of the one or more reduced data sizes for the at least one read operation is less than the maximum read data size and greater than zero.

14. The computer program product according to claim 13, further comprising the program instructions executable by a memory controller to cause the memory controller to:
responsive to detecting utilization of the memory interface bus for reads during the time window is less than the memory utilization threshold, select, by the memory controller, the maximum read data size for the size of data returned by the one or more read operations with the maximum read data size and the variable setting specifying one or more reduced read data sizes.

15. The computer program product according to claim 13, further comprising the program instructions executable by a memory controller to cause the memory controller to:
monitor, by the memory controller, for each of the one or more memory requests received via the interconnect, whether the one or more memory requests comprises at least one read operation with a separate variable setting specifying a separate reduced read data size, the one or more memory requests comprising one or more read requests and one or more write requests; and
responsive to detecting the at least one read operation with the separate variable setting specifying the separate reduced read data size from among the one or more memory requests, trigger, by the memory controller, tracking of the utilization of the memory interface bus for reads from and writes to the one or more memory devices for the selection of the one or more memory requests during the time window.

16. The computer program product according to claim 13, further comprising the program instructions executable by a memory controller to cause the memory controller:
monitor, by the memory controller, for each of the one or more memory requests received via the interconnect, whether the one or more memory requests comprises at least one read operation with a separate variable setting specifying a separate reduced read data size; and
responsive to detecting the at least one read operation with the separate variable setting specifying the separate reduced read data size from among the one or more memory requests, trigger, by the memory controller, comparison of the utilization of the memory interface bus for reads during the time window with a memory utilization threshold.

17. The computer program product according to claim 13, further comprising the program instructions executable by a memory controller to cause the memory controller to:
detect, by the memory controller, a particular level identified with the memory utilization threshold, from among a plurality of memory utilization thresholds each identified by a separate level; and
identify, by the memory controller, one of the one or more reduced read data sizes specified for the particular level.

* * * * *